United States Patent [19]

Castagna et al.

[11] Patent Number: 4,833,667
[45] Date of Patent: May 23, 1989

[54] SPINDLE MOTOR ASSEMBLY FOR LOW ACOUSTIC NOISE ENVIRONMENTS

[75] Inventors: Joseph T. Castagna; Joseph C. Cardona, both of San Jose, Calif.

[73] Assignee: Priam Corporation, San Jose, Calif.

[21] Appl. No.: 133,947

[22] Filed: Dec. 17, 1987

[51] Int. Cl.$^4$ ............................................. G11B 25/04
[52] U.S. Cl. ................................ 369/263; 360/98.07; 369/270
[58] Field of Search ............... 369/263, 266, 270, 271; 360/99, 98, 106, 97

[56] References Cited

U.S. PATENT DOCUMENTS 1,917,633  7/1933  Burt ...................................... 369/263
4,553,183  11/1985  Brown et al. ........................... 360/98
4,716,482  12/1987  Walsh .................................... 369/106

Primary Examiner—Steven L. Stephan
Attorney, Agent, or Firm—Flehr, Hohbach, Test, Albritton & Herbert

[57] ABSTRACT

A mounting structure for a spindle motor assembly is disclosed that is capable of reducing acoustic noise generated by the motor assembly. Standard spindle motor assembly parts are provided with a viscoelastic stator mounting system that isolates and damps vibrations between the rotor assembly and the rest of the spindle motor assembly. Additionally, rotor slots are provided in the rotor cap. The slots are designed to ensure that the resonant frequency of the rotor cap is substantially different than the switching frequency of the motor itself.

6 Claims, 4 Drawing Sheets

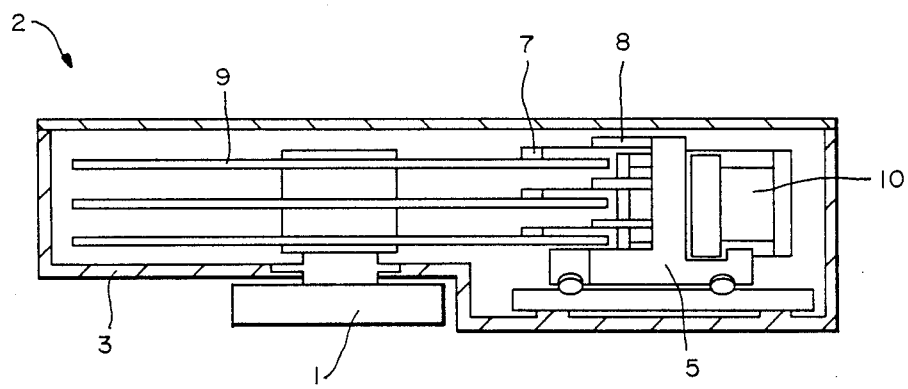
FIG.—1
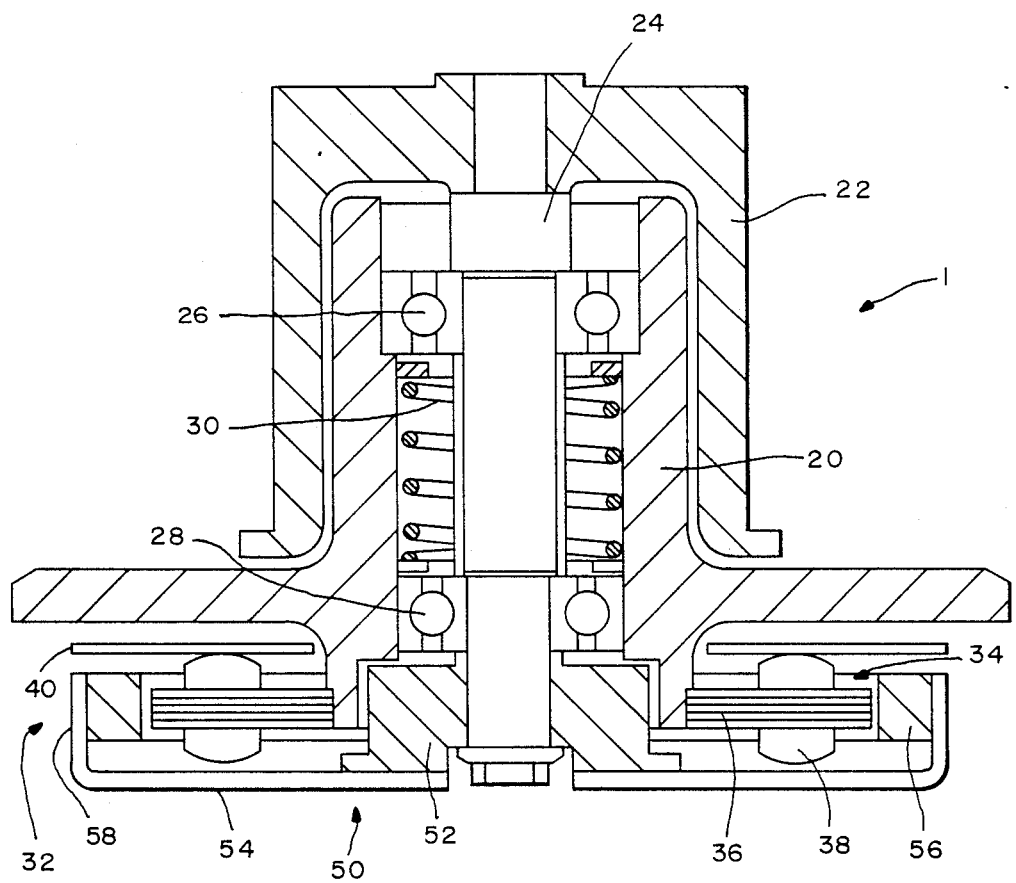
FIG.—2

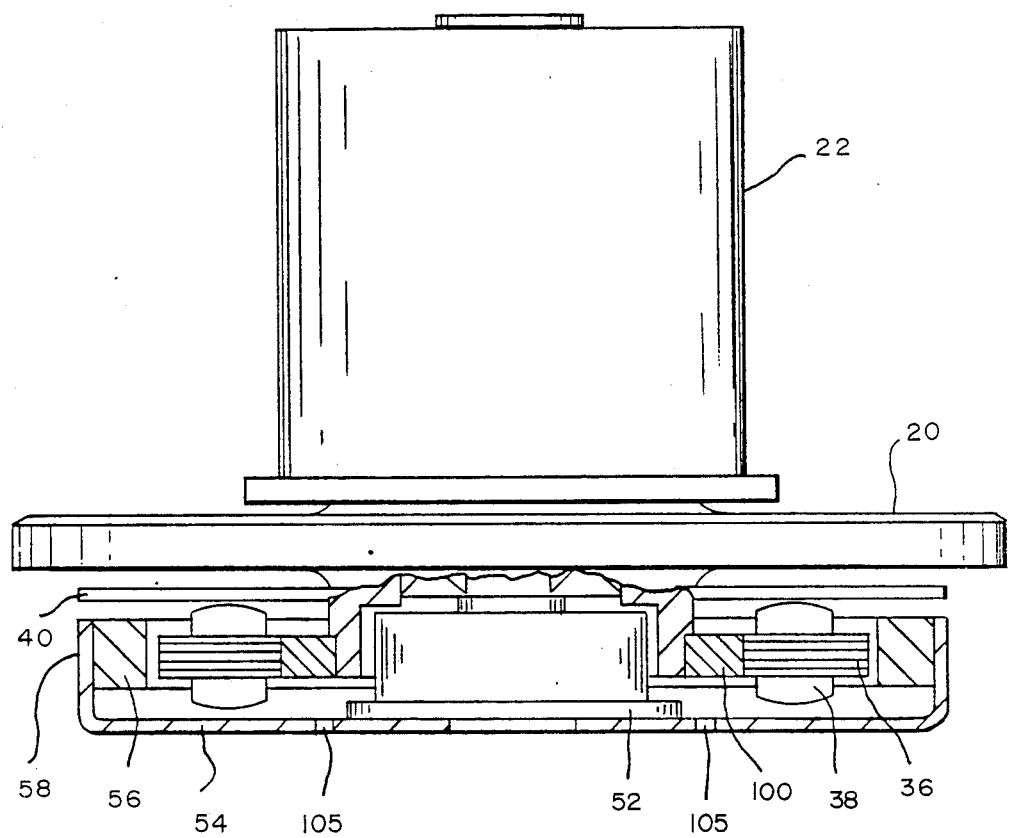
FIG.—3

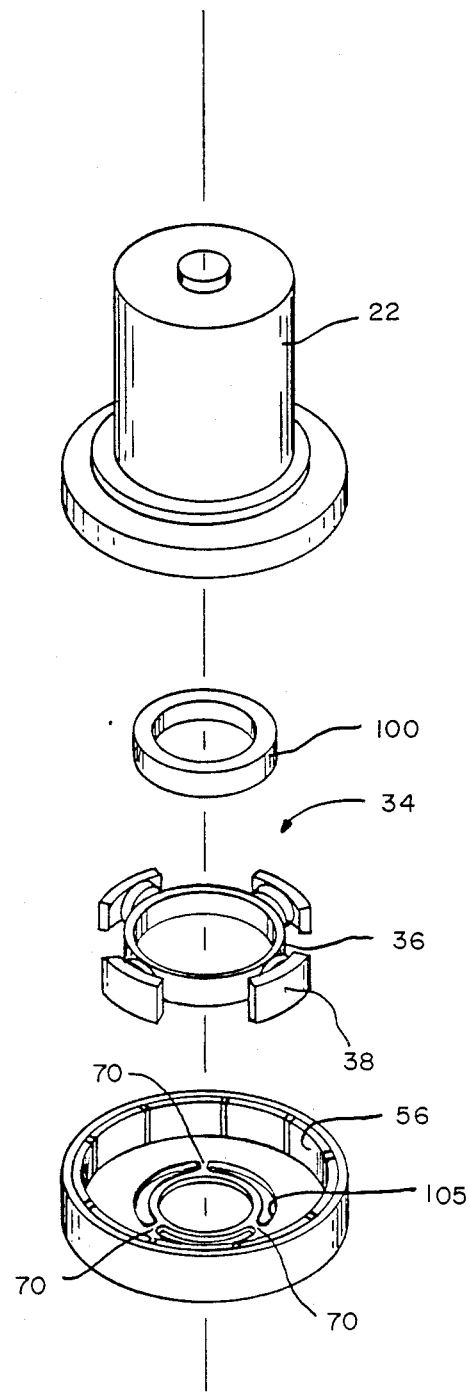
FIG.—4

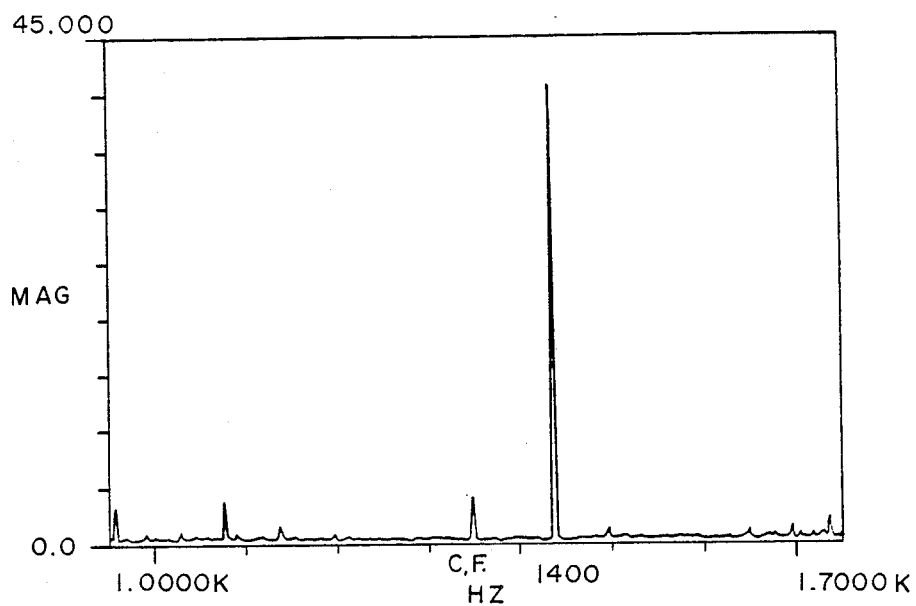
FIG.—5
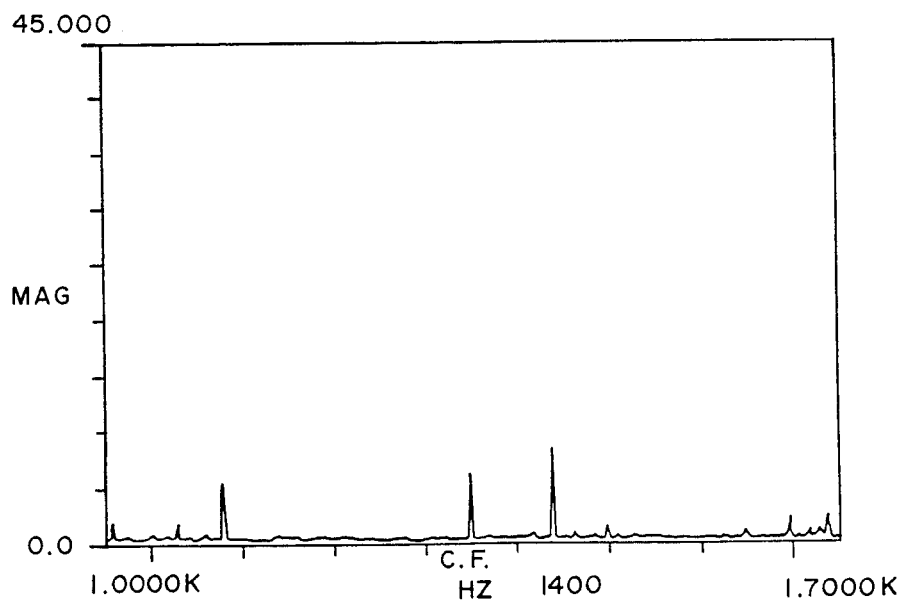
FIG.—6

SPINDLE MOTOR ASSEMBLY FOR LOW ACOUSTIC NOISE ENVIRONMENTS

The present invention relates generally to reducing acoustic noise in spindle motor assemblies. More particularly, the present invention discloses a spindle motor mounting technique and construction that reduces vibrations and acoustic noise produced by the motor.

Modern desk top computer systems require disc drives that are compact yet capable of rapidly retrieving information. As drive designs have become more compact and advanced, the acoustic noise generated by the drives has become an important design consideration. There are many potential sources of acoustic noise in disc drives. However, investigation has shown that one of the most constant and irritating components is the spindle motor assembly which supports, positions and spins the discs. Due to size constraints and other packaging requirements, the spindle motor designs frequently includes parts having structural mechanical resonances that may be excited by mechanical effects such as the motor switching. More particularly, production tolerances within the component parts and the solenoid effect tend to produce some force in the vertical direction every time the polarity of the windings is switched. Since the motor assembly is not rigid, the vertical forces produce vertical vibration. When the resonant frequency of a component such as the rotor cap is near the switching frequency of the motor, there is little damping of the vibrations. Such vibrations whether they be in the form of structural mechanical resonances or the forced response of a thin surface member, tend to produce acoustic noise which is extremely irritating to many users and conveys the appearance of an inferiorly constructed drive unit.

Therefore, it is a primary objective of the present invention to provide a novel spindle motor design that reduces vibration and acoustic noise.

Another object of the present invention is to provide a spindle motor assembly that reduces the amount of thermal transfer between the stator and the spindle flange.

To achieve the foregoing and other objects and in accordance with the purpose of the present invention, a spindle motor assembly is provided that is designed to substantially reduce vibrations that produce acoustic noise. The spindle motor assembly includes a fixed spindle flange having a spindle assembly rotatably coupled thereabout. The spindle assembly includes a spindle hub that is journaled about the spindle flange and a central shaft. A stator assembly is fixably connected to, yet mechanically isolated from the spindle flange. Specifically, a mounting member formed of a viscoelastic material is disposed between the spindle flange and the stator assembly for damping mechanical vibrations therebetween. The viscoelastic material dissipates mechanical vibrations in the form of heat. A rotor assembly including a rotor cap and having a plurality of magnets adapted to communicate with the stator windings is provided to rotate the spindle assembly relative to the spindle flange.

In an alternative preferred embodiment, the viscoelastic material may or may not form a portion of the mounting between the spindle flange and the stator assembly. However, in the alternative preferred embodiment, a plurality of cutouts are provided in the rotor cap. The cutouts substantially weaken the rotor cap and thereby alter its resonant frequency. The cutouts are designed to reduce the resonant frequency of the rotor cap so that it is at least 30% below the intended switching frequency of the spindle motor assembly.

The features of the present invention that are believed to be novel are set forth with particularity in the appended claims. The invention, together with further objects and advantages thereof, may best be understood by reference to the following description taken in conjunction with the accompanying drawings in which:

FIG. 1 is a partially cut-away side elevational view of the general layout of a typical disc drive showing the location of several of its key components.

FIG. 2 is a cut-away side elevational view of a typical prior art spindle assembly having an external motor.

FIG. 3 is a cut-away side elevational view of a spindle motor assembly incorporating an embodiment of the present invention.

FIG. 4 is an exploded view of the spindle motor assembly shown in FIG. 4.

FIG. 5 is a graph showing the acoustic response of a typical prior art spindle motor assembly.

FIG. 6 is a graph showing the acoustic response of a spindle motor assembly designed in accordance with this invention.

As illustrated in the drawings, the preferred embodiment of the present invention is adapted to reduce vibrations in spindle motor assemblies, particularly spindle motor assemblies adapted for use with disc drives. Referring first to FIG. 1, a standard disc drive system is shown in schematic form. The disc drive consists of a spindle motor assembly 1 disposed within a housing 3. A carriage 5, which is free to travel across a single axis within the housing 3 carries a plurality of magnetic heads 7 on head arms 8. A plurality of information carrying magnetic discs 9 are journaled about the spindle motor assembly 1. A voice coil motor 10 is adapted to translate carriage 5 back and forth within the housing in order to precisely position the magnetic heads 7 in a radial direction relative to the information discs 9.

The rotative action of spindle motor assembly 1, when combined with radial movements of heads 7 controlled by voice coil motor 10, allows random access to information stored on the discs 9.

FIG. 2 depicts a prior art spindle motor assembly. Specifically, the spindle motor assembly 1 includes a non-rotating spindle flange 20 that is securely fastenable to housing 3 as shown in FIG. 1. A rotatable spindle hub 22 is journaled about spindle flange 20 by rotatable spindle shaft 24. A pair of ball bearings 26 and 28 allows the spindle shaft 24 to freely rotate within the confines of spindle flange 20. An axial preloaded spring 30 maintains a constant load on the bearings.

A motor 32 is disposed directly underneath the spindle arrangement such that the motor components are located outside of the disc housing 3 when disc drive 2 is assembled. The motor 32 includes a stator assembly 34 and a rotor assembly 50. The stator assembly 34 includes an annular mounting ring 36 with a plurality of winding 38 disposed thereabout. The stator assembly also carries the motor electronics. Typically the motor electronics are substantially all placed on a printed circuit board 40. A rotor assembly 50 is attached to the spindle shaft 24 by a lower hub 52. The attachment between the rotor assembly 50, the lower hub 52 and spindle shaft 24 may be accomplished in any conventional manner. The rotor assembly 50 includes a cup shaped rotor cap 54 with a plurality of magnets 56 disposed about the interior of the raised annular flange portion 58 of rotor cap 54.

Modern desk top computer systems incorporate disc storage devices which necessarily must be compact in order to fit within the computer's confines. However, packaging constraints require parts to be designed to fit tightly together, thereby sacrificing some stiffness within the design. These weakened spindle motor assemblies are susceptible to excitation of structural mechanical resonances, which in turn often produce acoustic noise.

Although the optimal theoretical design of the spindle motor assembly would produce forces, and thereby motions in the rotational direction only, there are many flaws which tend to produce periodic vertical forces within the motor at a frequency that is related to the switching frequency of the motor. By way of example, the irregularities within production tolerances of various motor parts combined with lightly loaded bearings and the solenoid effect all work to induce vertical forces within the motor. These vertical force components produce equal and opposite forces on the stator and rotor, which tend to excite various resonances within the rotating assembly.

Previous attempts to reduce the acoustic output of spindle motor assemblies have, to a large degree, focused on applying a damping material, such as a free layer damping treatment formed of a viscoelastic material, on the bottom surface of the rotor cap. In theory, the damping material reduces any vibrations passed through the rotor. However, there are several drawbacks to such an approach. For example, it is relatively difficult to apply a damping treatment to the rotor in a manner that will not effect the dynamic balance of the spindle assembly. Such damping layers also often take up much of the necessary clearance space between the spindle motor and other disc drive components. Further, although the addition of such external damping layers may reduce the rotor response, in some situations the acoustic output of the assembly will actually increase. The increased acoustic output results from the rotor being caused to vibrate in phase with the center of the motor assembly, thereby producing a greater overall acoustic output.

The disadvantages of the prior art damping techniques can be overcome by designing a mounting system for the stator that allows the stator to move in the vertical direction. With such an arrangement, the stator will behave as a dynamic absorber effectively causing a force that resists the motion of the rotor. Referring next to FIGS. 3 and 4, the improvements of the present invention will be described. FIG. 3 details an embodiment of the improved spindle motor assembly which is equivalent to the spindle motor assembly described in relation to FIG. 2 in all respects except for two. First, the present invention includes a viscoelastic mounting piece 100 disposed between annular mounting ring 36 and spindle flange 20. Secondly, a plurality of cut-out rotor slots 105 are placed within the horizontal bottom portion of rotor cap 54. FIG. 4 shows an exploded view of the spindle motor assembly shown in FIG. 3.

The benefits of viscoelastic mounting piece 100 can essentially be thought of as allowing the stator to undergo resonance instead of the rotor. Specifically, mounting piece 100 mechanically isolates stator assembly 34 from the stationary spindle flange 20 and is comprised principally of a viscoelastic material having a high damping coefficient. Thus, relative movement between stator assembly 34 and rotor assembly 50 will take the form of a rigid body resonance of the stator assembly 34. Such a resonance, when properly chosen will reduce the acoustic output of the spindle motor assembly because mounting piece 100 is formed of a viscoelastic material which converts the vibrational energies associated with the motion of the stator into heat, and additionally causing a force in opposition to the rotor vibration through the magnetic coupling between the rotor and stator.

By way of example, an appropriate material to form viscoelastic mounting piece 100 is EAR-C1002 manufactured by Cabot Corp. of Indianapolis, Ind.

FIG. 5 shows the acoustic response of a typical external motor spindle assembly. The largest spike in acoustic response is a product of the switching frequency of the motor. Other notable spikes are caused by the test equipment limitations. Often one of the mechanical resonant frequencies of the rotor cap 54 is in the same vicinity as the switching frequency of the motor, as for example, within 15%. Thus, it may be desirable to affirmatively design rotor cap 54 such that it does not have any resonant frequencies in the neighborhood of the switching frequency of the motor. By way of example, it is desirable to have the resonant frequency at least 30% less than the expected motor switching frequency.

The primary resonant frequencies of the rotor cap can easily be computed using standard structural analysis techniques. Comparison of the rotor caps primary resonant frequencies with the anticipated motor switching frequency will determine whether rotor slots 105 are desirable. It will be appreciated that adding cut-out rotor slots 105 to the rotor cap's structure will substantially weaken the structure of the rotor cap 54 and thereby reduce its primary resonant frequency. Although the actual sizes, shapes and positions of the rotor slots 105 may be widely varied to suit a particular motor design, it has been discovered that a plurality of arcuate slots 105 arranged in annular fashion and having between to 2 and 4. bridges 70 is particularly suitable. A design having 3 such bridges 70 appears to be optimal. Preferably, the rotor slots 105 are relatively narrow in diameter and are disposed radially just outside lower hub 52 close to the center of the cap. Such positioning reduces the likelihood of dust accumulating within the rotor assembly 50 and reduces both random wind noise and turbulence generated by the rapidly spinning motor.

FIG. 6 shows the acoustic response of a spindle design in accordance with this invention. It is noted that the vibratory spike associated with the motors switching frequency has been substantially damped.

Although only one embodiment of the present invention has been described, it should be understood that the present invention may be embodied in many other specific forms without departing from the spirit or scope of the invention. Particularly, it will be appreciated by those skilled in the art that the specific position and size of the rotor slots may be widely varied within the teachings of the present invention to provide a suitable damping effect. Similarly, the particular viscoelastic material used to form mounting ring 36 may be widely varied to suit a particular application. Therefore the present examples and embodiments are to be considered as illustrative and not restrictive, and the invention is not to be limited to details given herein, but may be modified within the scope of the appended claims.

We claim:

1. In a disc drive assembly including a spindle motor assembly about which at least one information storage disc may be journaled and a means for transferring information between the disc and an external system, the spindle motor assembly including a spindle flange, a spindle arrangement rotatably coupled to the spindle flange and having a spindle hub and a shaft, a stator assembly fixably connected to the spindle flange, and a rotor assembly including a rotor cap and a plurality of magnets adapted to magnetically communicate with the stator to rotate the spindle hub about the spindle flange, the improvement comprising a mounting member formed of a viscoelastic material and disposed between the spindle flange and the stator assembly for mechanically isolating said stator assembly from the spindle flange to dampen mechanical vibrations within the rotor assembly through the magnetic communication between said magnets and said stator.

2. A spindle motor assembly comprising:
   a spindle flange;
   a spindle arrangement rotatably coupled to said spindle flange and including a spindle hub and a shaft;
   a stator assembly fixably connected to said spindle flange, said stator assembly including a plurality of windings;
   a mounting member formed of a viscoelastic material and disposed between said spindle flange and said stator assembly for mechanically isolating said stator assembly from the spindle flange to dampen mechanical vibrations within the spindle motor assembly; and
   a rotor assembly including a rotor cap and a plurality of magnets adapted to magnetically communicate with said stator windings to rotate said spindle hub about said spindle flange.

3. A spindle motor assembly as recited in claim 2 further comprising a lower hub for attaching said rotor cap to said spindle shaft wherein said rotor cap includes a plurality of annularly arranged cutout rotor slots disposed radially outside of the lower hub, whereby the rotor slots alter the resonant frequency of the rotor cap to reduce vibrations within said rotor cap.

4. A spindle motor assembly as recited in claim 3 wherein said motor assembly is designed to operate at a selected switching frequency and said rotor slots are designed to reduce the primary resonant frequency of the rotor cap to no greater than 70% of the selected switching frequency.

5. A spindle motor assembly adapted for operation at a selected switching frequency, the spindle motor assembly comprising:
   a spindle flange;
   a spindle assembly rotatably coupled to the spindle flange and including a spindle hub and a spindle shaft;
   a stator assembly fixably connected to the spindle flange said stator assembly including a plurality of windings;
   a rotor assembly including a rotor cap and a plurality of magnets adapted to communicate with said stator windings, wherein said rotor cap is fixably attached to said spindle assembly and adapted for rotation about said stator;
   attachment means for mounting said rotor assembly to the spindle shaft;
   control means for switching the polarity of said stator windings to cause said rotor to rotate about said stator at a selected frequency; and
   a plurality of rotor slots cut into the rotor cap at a position that is radially outward of the attachment means, whereby said slots alter the primary resonant frequency of said rotor cap from a value that is within 15 percent of the selected switching frequency to a value that is at least 30 percent lower than said selected switching frequency.

6. A spindle motor assembly as recited in claim 5 wherein said rotor slots are arcuate and arranged in annular fashion.

* * * * *